United States Patent [19]

Katto et al.

[11] Patent Number: 5,187,257

[45] Date of Patent: Feb. 16, 1993

[54] THERMOFORMED POLYARYLENE SULFIDE CONTAINER

[75] Inventors: Takayuki Katto; Yukio Ichikawa; Toshio Enoki, all of Iwaki; Kenichi Katase, Ushiku, all of Japan

[73] Assignee: Kureha Kagaku Kogyo Kabushiki Kaisha, Tokyo, Japan

[21] Appl. No.: 902,556

[22] Filed: Jun. 22, 1992

Related U.S. Application Data

[63] Continuation of Ser. No. 524,330, May 16, 1990, abandoned, which is a continuation of Ser. No. 433,391, Nov. 7, 1989, abandoned, which is a continuation of Ser. No. 185,681, Apr. 22, 1988, abandoned.

[30] Foreign Application Priority Data

Apr. 24, 1987 [JP] Japan ................... 62-101589

[51] Int. Cl.$^5$ ............................. C08G 75/14
[52] U.S. Cl. .................... 528/388; 525/537; 264/331.11
[58] Field of Search .......... 528/388; 525/537

[56] References Cited

U.S. PATENT DOCUMENTS

| 4,370,469 | 10/1983 | Deguchi et al. | 528/388 |
|---|---|---|---|
| 4,503,168 | 3/1985 | Hartsing, Jr. et al. | 523/100 |
| 4,645,826 | 2/1987 | Iizuka et al. | 528/388 |
| 4,657,717 | 4/1987 | Cattanach et al. | 264/10.2 |
| 4,680,157 | 7/1987 | Fujii et al. | 264/180 |
| 4,735,828 | 4/1988 | Cogswell et al. | 427/359 |
| 4,737,389 | 4/1988 | Hartsing, Jr. et al. | 428/35 |
| 4,780,359 | 10/1988 | Trask et al. | 428/234 |

FOREIGN PATENT DOCUMENTS

| 166451 | 1/1986 | European Pat. Off. . |
| 201851 | 11/1986 | European Pat. Off. . |
| 233494 | 6/1987 | European Pat. Off. . |
| 260871 | 3/1988 | European Pat. Off. . |

OTHER PUBLICATIONS

T. P. Martha et al, Properties and Processing of Ryton PPS Composites, Oct. 7-9, 1986, 18th Inter. SAMPE Technical Conference, pp. 180-192.

Japanese Patent Application Laid-Open (Koakai) No. 59-062660.

Japanese Patent Application Laid-Open (Kokai) No. 61-259976.

Japanese Patent Application Laid-Open (Kokai) No. 61-242841.

*Primary Examiner*—Melvyn I. Marquis
*Assistant Examiner*—Helen F. Lee
*Attorney, Agent, or Firm*—Oblon, Spivak, McClelland, Maier & Neustadt

[57] ABSTRACT

Disclosed herein is a crystallized, thin-wall container which is excellent in heat-resistance, oil-resistance, chemical stability under high temperature and high humidity and gas impermeability, is particularly suitable for heating foodstuffs packaged in it in electronic range, electric oven, etc. and is obtained by thermoforming a substantially amorphous sheet which has a crystallinity index of below 15% and an elongation of not less than 100% at room temperature and is obtained from a poly(arylene sulfide) which has a substantially linear structure, has not less thant 70 wt % of a repeating unit of

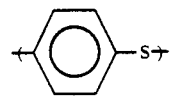

and a logarithmic viscosity number of 0.2 to 1.0 in a solution of 1-chloronaphthalene (concentration of 0.4 g/dl at a temperature of 208° C.) and a process for producing the container.

4 Claims, No Drawings

THERMOFORMED POLYARYLENE SULFIDE CONTAINER

This application is a continuation of application Ser. No. 07/524,330, filed on May 16, 1990, now abandoned, which is a continuation of Ser. No. 07/433,391 filed Nov. 7, 1989, now abandoned, which is a continuation of Ser. No. 07/185,681 filed Apr. 22, 1988 now abandoned.

BACKGROUND OF THE INVENTION

The present invention relates to a thermoformed container which is excellent in heat-resistance, oil-resistance, chemical stability under high temperature and high humidity and low gas permeability and is obtained by thermoforming a poly(arylene sulfide) (hereinafter referred to as "PAS") and a process for producing the container.

PAS is, as has been publicly known, an excellent engineering plastic having thermal resistance, chemical resistance (acid-resistance, alkali-resistance and solvent-resistance), oil-resistance, hot water-resistance, processability and mechanical properties and is used in various fields.

Further, taking advantage of these excellent properties, its use is being extended to the fields of fibers and films.

On the other hand, in recent years, as a heat-resistant plastic container, for instance, a thermoformed container for foodstuff which can be used in an electronic range and an electric oven for domestic use and resist to an oven temperature of almost 200° C., an easily crystallizable polyethylene terephthalate (hereinafter referred to as "PET") has attracted public attention.

However, the PET container has a defect that it can not resist to a temperature of higher than 200° C., particularly higher than 220° C. in an electric oven. As is well known, PAS has higher melting point than PET and from a viewpoint of heat-resistance, PAS has more excellent performance than PET. Further, PAS has more excellent chemical stability under high temperature and high humidity and solvent-resistance than PET.

These excellent properties of PAS are mainly due to the fact that PAS is crystallized.

The present invention relates to obtaining a heat-resistant container by thermoforming a sheet of PAS which is substantially amorphous.

As a result of the present inventors' extensive studies to obtain a heat-resistant PAS container by thermoforming taking advantage of these characteristic points of PAS, the present inventors have attained the present invention.

SUMMARY OF THE INVENTION

The object of the present invention is to provide a thermoformed PAS container which is excellent in heat-resistance, oil-resistance, chemical stability under high temperature and high humidity and low gas permeability and a process for producing the container.

Further, the object of the present invention is to provide a container suitable to heat its packaged foodstuff in electronic range, electic oven, etc. and a process for producing the same.

Still further, the object of the present invention is to provide a crystallized, thin-wall container which is obtained by thermoforming a substantially amorphous sheet having a crystallinity index of below 15% and an elongation of not less than 100% at room temperature, which is prepared from a PAS having substantially linear structure, not less than 70 wt % of a repeating unit of

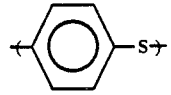

and a logarithmic viscosity number of 0.2 to 1.0 in a solution of 1-chloronaphthalene (concentration of 0.4 g/dl at a temperature of 208° C.) and a process for producing the container.

DETAILED DESCRIPTION OF THE INVENTION

The crystallized, thin-wall container according to the present invention is obtained by thermoforming a sheet of an improved crystallization rate, having a crystallinity index of below 15% and an elongation, at room temperature, of not less than 100% and a half-width of the peak on a crystallization curve, obtained when a temperature is raised from its amorphous state, of not more than 15° C. Said sheet is obtained from a PAS having a substantially linear structure, not less than 70 wt % of a repeating unit of

and a logarithmic viscosity number of 0.2 to 1.0 (hereinafter means the value measured in a solution of 1-chloronaphthalene at a concentration of 0.4 g/dl and at a temperature of 208° C.). Further, the process for producing the container is to thermoform the sheet with at least a shaping step and a crystallization step.

The thermoformed PAS container according to the present invention is excellent in heat-resistance, mechanical properties, chemical resistance, chemical stability under high temperature and high humidity and oil-resistance and particularly, has a characteristic features of being reliable at high temperatures compared to thermoformed PET containers and of being improved in chemical stability under high temperature and high humidity.

MATERIAL FOR CONTAINER

PAS for a thermoformed container of the present invention is a polymer containing not less than 70 wt %, preferably not less than 80 wt % and more preferably not less than 90 wt % of p-phenylene sulfide unit,

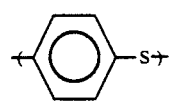

as the main constituent. The fact that the content of p-phenylene sulfide unit is not less than 70 wt % means that the PAS may contain not more than 30 wt % of another constituent of copolymer and as the constituent of copolymer, for instance, a metaphenylene sulfide unit,

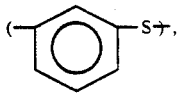

a diphenylketone sulfide unit,

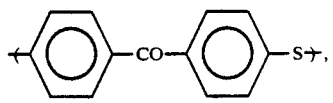

a diphenylsulfone sulfide unit,

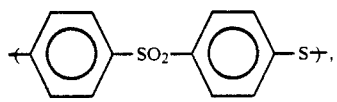

a diphenylether sulfide unit,

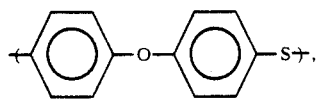

a 2,6-naphthalene sulfide unit,

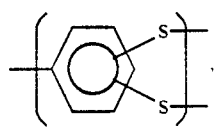

a trifunctional unit,

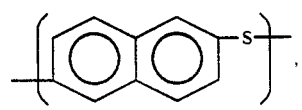

etc. may be mentioned and the content of a multifunctional unit not lower than trifunctional is preferably not more than 1 mol %.

The PAS polymer of high polymerization degree having a high solution viscosity can be produced, for instance, by the method described in U.S. Pat. No. 4,645,826.

Further, a block copolymer having paraphenylene sulfide repeating unit,

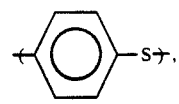

as the main constituent, for instance, a block copolymer containing 70 to 95 mol % of a repeating unit of

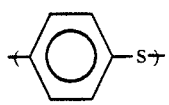

and 5 to 30 mol % of a metaphenylene sulfide repeating unit of

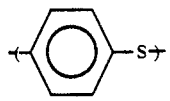

in the polymer chain can preferably be used.

Such block copolymer having a high melt viscosity can be manufactured by the process described in, for instance, Japanese Patent Application Laid-Open (KOKAI) NO. 61-14,228 (1986).

A material resin used for a thermoformed container of the present invention is the PAS having the chemical structure described above and a solution viscosity as the logarithmic viscosity number, $\eta_{inh}$, of 0.2 to 1.0 (dl/g) preferably 0.25 to 0.9 (dl/g). When a solution viscosity of the material resin is low, namely, when its logarithmic viscosity number, $\eta_{inh}$ is below 0.2, it is not preferable because there is a difficulty in its melt molding to sheet or thermoforming of the sheet or even when the thermoforming is possible, the product is weak in its strength.

On the other hand, when the resin has an $\eta_{inh}$ of more than 1.0, a melt molding to a uniform sheet or a thermoforming of the sheet becomes difficult and accordingly, the both resin are not preferable.

From the viewpoint of its processability, a preferable PAS according to the present invention is the one having substantially linear structure, however, the PAS obtained, for instance, by polymerizing the monomers while using a small amount of a cross-linking agent (not more than 1.0 mol %) or by thermally treating a PAS in the presence of oxygen at a high temperature to increase the melt viscosity, can be used.

Because it becomes difficult to melt mold the material resin to a sheet or to thermoform the sheet when a cross-linking degree become too high, it is preferable to use not more than 1 mol % of cross-linking agent to the monomers. On the other hand, an increase of melt viscosity of not more than five times by curing PAS to the melt viscosity of before curing. is preferable.

To thermoform a PAS which is substantially amorphous, a PAS sheet is preliminarily heated to the temperature sufficient to transform it, then the sheet is brought into close contact to the inner surface of a mold by a known method of vacuum assist or compressed air assist and then the crystallization is promoted, however, from the viewpoint of shortening the molding cycle, the higher crystallization rate is more preferable.

To make the time of crystallization shorter, it is preferable that the crystallization rate of PAS is higher. Since the crystallization rate of PAS is inherently higher than that of PET, PAS can be used in thermal molding by itself. A PAS and a PAS composition of which the crystallization rate have been improved can preferably be used. As such PAS and PAS composition, the following substances can be exemplified:

(a) PAS as described in EP-216,116A, treated with an aqueous-and-a-like solution of a salt of strong acid-weak base, namely aqueous solution or a mixed solution of water (as the main component) and a water-soluble organic solvent, such as alcohol or ketone, etc. of the salt, more concretely, an aqueous solution of ammonium chloride, (b) PAS composition containing not more than 3% by weight of at least one of inorganic materials selected from the group consisting of kaolin, talc, mica, activated clay, zirconium oxide, diatomaceous earth and titanium oxide, as a nucleating agent, or (c) PAS composition containing not more than 10% by weight of poly(biphenylene sulfide) (hereinafter referred to as "PBS") consisting mainly of a repeating unit of

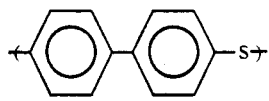

as a nucleating agent.

The PBS herein mentioned, is a polyarylene sulfide having a repeating unit of

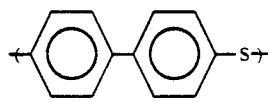

as the main constituent and a melting point (hereinafter referred to as "Tm") of not lower than 290° C. or the melt crystallization temperature (hereinafter referred to as "$Tc_2$") of not lower than 220° C.

The words "having the repeating unit as the main constituent" mean that PBS contains not less than 50 wt %, preferably not less than 60 wt % of a repeating unit of When the content of the repeating unit is below 50 wt %, the effect as a nucleating agent, namely, the effects of improving the crystallization rate and micronizing the spherulites size is lowered and accordingly, is not preferable.

As a repeating unit other than

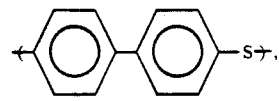

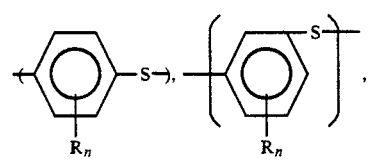

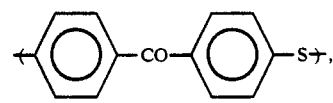

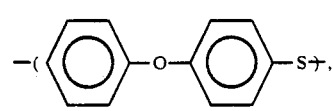

-continued

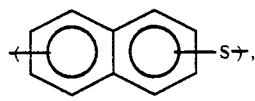

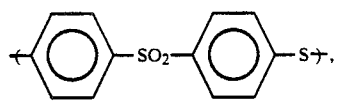

etc. are preferable, (wherein R is a hydrogen atom or an alkyl group having not more than 5 carbon atoms and n is an integar of 1 to 4).

Among PBSs containing a repeating unit other than

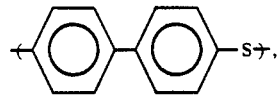

namely a copolymer, the one having Tm of not lower than 290° C. or $Tc_2$ of not lower than 220° C. is preferable and the one having Tm of not lower than 330° C. or $Tc_2$ of not lower than 240° C. is more preferable.

When the Tm is below 290° C. and the $Tc_2$ is below 220° C., the effect of the nucleating agent becomes insufficient and accordingly is not desirable.

Besides, copolymers of

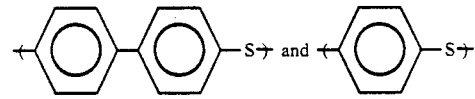

having Tm of not lower than 290° C. or $Tc_2$ of not lower than 220° C. are remarkably excellent as nucleating agents and accordingly, can preferably be used in particular.

Among homopolymers,

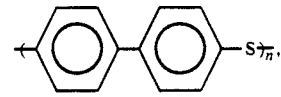

those having Tm in the range of 400° to 450° C. or $Tc_2$ in the range of 280° to 350° C. are remarkably excellent as nucleating agent and accordingly, they can preferably be used in particular.

It is preferable that the adding amount of PBS to PAS is not more than 10% by weight. When PBS is added in an amount of over 10% by weight, its nucleating effect does not increase in proportion to the amount and the part over 10% works only as a filler.

Furthermore, it is desirable that the polymeric nucleating agent is dispersed well in PAS in order to exhibit its effect as the agent satisfactorily.

The addition of the polymeric nucleating agent can be performed by any optional method, for instance, a method of adding the agent to a powdery PAS, a method of adding the agent to PAS at the time of molding and a method of adding the agent to a polymeric slurry of PAS after polymerization and dehydrating and drying the mixture.

Although it is preferable that said PAS composition is used as it is, it is also possible to add an inorganic filler, a coloring agent, a stabilizer, a releasing agent, etc. to the composition in the range of not causing any damage to a molding of the composition into a sheet or to a thermoforming of the sheet.

Furthermore, a thermoplastic resin other than PAS can also be blended with PAS in the range of not causing any damage to a molding of the composition to a sheet or to a thermoforming of the sheet. As the inorganic filler, mica, talc, $TiO_2$, $SiO_2$, $Al_2O_3$, $CaCO_3$, kaolin, carbon black, activated clay, diatomaceous earth, zirconium oxide, etc. may be mentioned.

Among inorganic fillers, there is a filler such as kaolin, talc, mica, activated clay, zirconium oxide, diatomaceous earth and titanium oxide, used as a nucleating agent and a small amount of the filler can be added according to the necessity. Particularly, kaolin has a large effect as a nucleating agent and is preferably used.

When an inorganic material is used as the nucleating agent, the amount of addition of not more than 3 wt % is preferable. Because, when than 3 wt % of inorganic material is added, the effect does not increase in proportion to the amount added.

The addition of the inorganic material as the nucleating agent can be performed by any optional method, for instance, a method of adding the material to a powdery PAS, a method of adding the material to PAS at the time of molding and a method of adding the material to a polymeric slurry of PAS after polymerization and dehydrating and drying the mixture.

PRODUCTION OF THERMOFORMED CONTAINER

Outline

The present invention relates to the production of a crystallized, thin-wall container from a PAS sheet being substantially amorphous by a conventional, thermoforming apparatus.

The process for producing the container comprises mainly the following steps:

(a) Extrusion molding step.

A sheet of substantially amorphous is molded from a PAS composition by extrusion molding.

(b) Thermoforming step.

A container is formed from the sheet by thermoforming. The forming is performed through at least (1) a shaping step and (2) a crystallizing step.

Extrusion molding step

The production of a sheet or a film (hereinafter referred to as simply "sheet") by extrusion molding can be performed usually by any known method and most commonly, they are molded with T-die. The thickness of the sheet is preferably in a range of 0.05 to 1 mm and since it is necessary to cool the sheet rapidly to have it in an amorphous state, too thick sheet is not preferable.

When a thickness of the sheet is more than 1 mm, its inner part is likely to crystallize even when the sheet is rapidly cooled. Accordingly, such a sheet is not preferable.

On the other hand, when a thickness of the sheet is less than 0.05 mm, the container obtained by thermoforming of the sheet is poor in keeping its shape. Accordingly, both cases are not preferable.

At a time of molding the composition to sheet, it is necessary to rapidly cool the extruded sheet immediately after the extrusion to keep the crystallinity at the minimum and the temperature of casting rolls (cooling rolls) to cool the sheet rapidly, which is extruded through a T-die and almost in a molten state, is preferably not higher than 110° C., more preferably not higher than 100° C. and much more preferably not higher than 90° C.

The words "the substantially amorphous sheet" used in the present invention mean the sheet which has a sufficiently low crystallinity to perform a thermoforming in the later step. Concretely, it is desirable that the sheet has the crystallinity index of below 15% and the elongation of not less than 100% at room temperature. The sheet having the crystallinity index of not less than 15% or the elongation of below 100% at room temperature, is difficult to be thermoformed and accordingly, is not preferable.

When a substantially amorphous sheet is thermoformed by a mold, it is usually necessary to heat the sheet preliminarily. In this case, it is necessary to heat the sheet to a temperature not lower than the glass transition temperature (hereinafter referred to as "Tg") of PAS. However, if the sheet is heated too high, its crystallization is promoted too much and make a stretching in the later stage difficult and therefore, it is preferable to keep the preliminary heating temperature in the range of higher than Tg and lower than $Tc_1$. The $Tc_1$ herein mentioned is the crystallization temperature of PAS when it is heated from a solid and amorphous state. Practically, it is preferable to have the preliminary heating temperature in the range of 80° to 130° C.

Thermoforming step

The thermoforming comprises (i) giving a negative or a positive pressure to the sheet under heating, (ii) keeping the sheet in close contact with the inner surface of a mold and (iii) obtaining a formed product of the same shape as the mold. Following this shaping step, the crystallization step is performed.

The thermoforming is a publicly known technique and as a method of shaping, a vacuum forming, an air pressure forming, etc., which are known, are used. As examples of the vacuum forming method, a straight forming, a drape forming, a plug-assist forming, a matched mold forming, etc. may be mentioned. On the other hand, as examples of the crystallization method, a method of further holding a shaped container in the mold which is heated to higher than its crystallization temperature for an appropriate period of time and have the shaped container crystallized, a method to promote crystallization of a shaped container by holding it in another mold, which is heated to the appropriate temperature for promoting crystallization of the container, after removing it from the original mold and a method to promote crystallization by having a shaped container got in touch with an organic solvent or an organic gas as is described in Europian Patent Application, No. 0,233,494-A can be mentioned.

The crystallization temperature in the step of crystallization is principally between $Tc_1$ and Tm. However, when the crystallization is performed only by heating, the practical temperature is in the range of 130° to 250° C. When the crystallization is performed by making a shaped container in contact with an organic solvent or an organic gas, it is sufficiently promoted even at the temperature of not higher than Tg of PAS and the crystallization is performed at a temperature in the range of room temperature to 200° C.

Since the crystallinity index affects the physical properties of the final thermoformed container, particularly its heat-resistance, it is preferable that the crystallization is sufficiently promoted. From this viewpoint, it is preferable that the container according to the present invention has the crystallinity index of not lower than 15% in order to exhibit the characteristic features of PAS, namely, the high melting point and the high heat-resistance, etc.

Furthermore, from the viewpoint of shortening the forming cycle of the container, it is necessary to have a high crystallization rate and as an index of the rate, it is preferable that the peak of the crystallization curve, obtained on crystallization when the temperature is raised from the solid and amorphous state, has the sharpness, of which half-width is not larger than 15° C.

The formed container is trimmed after the crystallization step and the scrap is pulverized and re-used in the step extruding the sheet.

CRYSTALLIZED, THIN-WALL CONTAINER

Thickness of the container obtained, the product, is preferably in the range of not less than 0.04 mm and less than 1 mm. Because, when a thickness of the sheet before forming is too thick to give the wall-thickness of not less than 1 mm, it is difficult to obtain the sheet which is substantially and uniformly amorphous. On the other hand, when a thickness of the container is less than 0.04 mm, the shape keeping property of the container is poor. Accordingly, both cases are not preferable.

The thermoformed container obtained according to the present invention can be utilized in various fields such as industrial uses, foodstuff uses, medical uses, grocery uses, etc., taking advantages of its characteristic points, such as excellent heat-resistance, chemical stability under high temperature and high humidity, chemical-resistance, oil-resistance, resistance to hot water, low gas permeability, etc.

Particularly, the crystallized, thin-wall container according to the present invention is useful as a heat-resistant container for foodstuffs, which can resist to a high temperature in an electronic range, an electric oven and a gas oven.

MEASUREMENT

Measurement of various transition points and half-width of the crystallization peak Transition points and half-width of the crystallization peak were measured with a differential, scanning calorimeter made by Metler Co. (type TA-3000[DSC-20]) under an atmosphere of nitrogen gas at the temperature-raising rate and the temperature-lowering rate of 10° C./minute.

Further, before lowering the temperature, it was kept for one minute at about 50° C. higher than the melting point of a specimen. As a specimen, a rapidly cooled, pressed sheet or a rapidly cooled, extruded sheet was used.

Tg means the glass transition temperature;
Tm means the melting point;
$Tc_1$ means the crystallization temperature when a specimen is heated from its solid and amorphous state; and
$Tc_2$ means the crystallization temperature when a specimen is cooled from the molten state.

Tg, $Tc_1$ and Tm were measured by raising its temperature. Tg is a temperature at which the absorption of the heat was started and both $Tc_1$ and Tm are the peak temperatures. $Tc_2$ is the peak temperature measured by lowering the temperature. The half-width of the crystallization peak was obtained as an integral half-width of $Tc_1$ peak obtained by the above measurement. As to polymers of the same kind, the crystallization rate is higher when $Tc_1$ is lower and $Tc_2$ is higher, and also when a half-width of the crystallization peak is smaller.

Crystallinity index

The crystallinity index, Ci, was measured as follow:
(1) separate a crystalline scattering intensity Ac and an amorphous scattering intensity Aa from a wide angle X-ray diffraction pattern of each sample at $2\theta = 17°$ to $23°$; and
(2) calculate Ci with the following formula:

$$Ci(\%) = [Ac/(Ac+Aa)] \times 100.$$

For a detail of the method, refer to "Journal of Applied Polymer Science, Vol. 20, p. 2541 (1976).

Measurement of melt viscosity

The melt viscosity was measured with a CAPILLO-GRAPH made by TOYO-SEIKI Co. The measurement was performed at a temperature of 310° C. with a nozzle of L/D of 10 mm/1 mm and under a shear rate of 200/second.

Measurement of solution viscosity (logarithmic viscosity number)

The logarithmic viscosity number, $\eta_{inh}$, was measured by an Ubelohde-type viscometer under the following conditions:
solvent: 1-chloronaphthalene
concentration: 0.4 g/dl
temperature: 208° C.

Measurement of elongation

The elongation is represented by the elongation measured under the tensile speed of 50 mm/minute at 23° C. in accordance with Japanese Industrial Standards (JIS) K 6734.

EXPERIMENTAL EXAMPLES

EXAMPLES OF SYNTHETIC EXPERIMENT (1) Synthesis of Poly(Paraphenylene Sulfide) (hereinafter referred to as "PPPS")

Into an autoclave, 90 kg of N-methylpyrrolidone (hereinafter referred to as "NMP") and 33.9 kg of $Na_2S.5H_2O$ containing 46.02 wt % of $Na_2S$ were charged and 13.7 kg of water, 8.3 kg of NMP and 6.2 mol of $H_2S$ were distilled out while raising the temperature of the content slowly to 203° C. under an atmosphere of nitrogen gas.

Then, 28.8 kg of paradichlorobenzene (hereinafter referred to as "PDCB") and 15 kg of NMP were added to the content and the content was polymerized at 210° C. for 10 hours.

After adding 9.32 kg of water to the system with pressure, the content was further polymerized at 260° C. for 10 hours. After cooling, the reaction mixture was sieved with a screen of 0.1 mm opening and a granular polymer was separated, then the polymer was washed with acetone and then with water to obtain the washed polymer.

By drying about half of the obtained polymer, PPPS (Polymer A-1) was obtained.

Then, the remaining amount of the polymer was immersed in a 2% aqueous solution of $NH_4Cl$ and treated for 30 minutes at 40° C. The treated polymer was washed with water and then dried to obtain Polymer A-2.

Viscosity, $\eta_{inh}$, of both polymers were 0.39.

(2) Synthesis of PPPS

Into an autoclave, 110 kg of NMP and 33.6 kg of $Na_2S.5H_2O$ were charged and 15.5 kg of water and NMP and 4.5 mol of $H_2S$ were distilled out while raising the temperature of the content slowly to 200° C. under an atmosphere of nitrogen gas.

After cooling to 130° C., 28.7 kg of PDCB and 30 kg of NMP were charged into the autoclave and the content was polymerized at 210° C. for 10 hours. After cooling, the reaction mixture was sieved with a screen of 0.1 mm opening and a granular polymer was separated, then the polymer was washed with acetone and then with water and dried to obtain PPPS(Polymer B). $\eta_{inh}$ of Polymer B was 0.49 and the melt viscosity of Polymer B at 310° C. and 200/second was 8,200 poise.

(3) Synthesis of Block Copolymers of Paraphenylene Sulfide and Metaphenylene Sulfide (a) Into an autoclave, 80 kg of NMP and 37.4 kg of $Na_2S.5H_2O$ containing 45.0 wt % of $Na_2S$ were charged and 15.2 kg of water, 14.8 kg of NMP and 5.3 mol of $H_2S$ were distilled out while heating the content slowly to 200° C. under an atmosphere of nitrogen gas.

Then, 30.9 kg of metadichlorobenzene, 42.2 kg of NMP and 1.0 kg of water were charged into the autoclave and the content was polymerized for 2 hours at 220° C. and further for 7 hours at 230° C.

(b) Into another autoclave, 75 kg of NMP and 30.6 kg of $Na_2S.5H_2O$ containing 45.9 wt % of $Na_2S$ were charged and 12.7 kg of water, 13.5 kg of NMP and 5.1 mol of $H_2S$ were distilled out while heating the content slowly to 200° C. under an atmosphere of nitrogen gas.

Then, 26.4 kg of paradichlorobenzene, 25 kg of NMP, 1.0 kg of water and 23.2 kg of polymetaphenylene sulfide slurry obtained in (a) were charged into an autoclave and the content was polymerized for 10 hours at 220° C. Then, 13.0 kg of water were added and the content was further polymerized at 260° C. for 5 hours.

By treating the polymerization mixture in the same manner as (1), the block copolymer (C-1) not treated with $NH_4Cl$ and the block copolymer (C-2) treated with $NH_4Cl$ were obtained. $\eta_{inh}$ of the block copolymers (C-1) and (C-2) were 0.34 and the ratio of paraphenylene sulfide to metaphenylene sulfide of the copolymers was 85/15 according to the infrared absorption spectra.

(4) Synthesis of Poly(Biphenylene Sulfide) (hereinafter referred to as "PBS")

In a 5 liter autoclave, PBS was obtained by polymerizing 4,4'-dibromobiphenyl and $Na_2S$ in the presence of $H_2O$ and NMP in the following ratio at 240° C. for 5 hours:

4,4'-dibromobiphenyl: 1.0 mol
$Na_2S$: 1.0 mol
$H_2O$: 2.0 mol
NMP: 1.0 kg.

Tm and $Tc_2$ of the obtained polymer (Polymer D) were 430° C. and 302° C., respectively.

(5) Production of The Composition

By a Henschel mixer, the following blended compositions are prepared:

Composition (1): A blended compositon obtained by adding 1% by weight of kaoline (made by SHIRAISHI Calcium Co., under the mark of CB, average particle diameter of 1 μm) to Polymer B (PPPS).

Composition (2): A blended composition obtained by adding 1% by weight of Polymer D (PBS) to Polymer B (PPPS).

MOLDING EXAMPLES 1 to 8

PPPS or PPPS compositions obtained in the above Synthetic Examples were pelletized by a pelletizer.

(1) Molding of The Sheet

The pellets were extruded through a T-die of 25 cm in width and having a lip with gap of 0.55 mm at 320° C. and the extruded materials were casted and rapidly cooled on casting rolls of which surface temperature was kept at 85° C. (for PPPS) and 80° C. (for block copolymer) and obtained an amorphous sheets of 20 cm in width and about 180 μm in thickness.

The transition temperature, the crystalline feature and the elongation of each of the obtained sheets are shown in Table 1.

TABLE 1

TRANSITION TEMPERATURE AND CRYSTALLINE FEATURE OF SHEET

| No. | Sheet | Elongation | Transition Temperature (°C.) | | | | Half-width (°C.)[1] |
|---|---|---|---|---|---|---|---|
| | | | Tg | $Tc_1$ | Tm | $Tc_2$ | |
| Ex. 1 | A-1 (PPPS) | 230 | 86 | 132 | 277 | 218 | 7 |
| Ex. 2 | A-2 (PPPS treated with $NH_4Cl$) | 210 | 86 | 123 | 278 | 240 | 5 |
| Ex. 3 | B (PPPS) | 245 | 88 | 137 | 276 | 216 | 11 |
| Ex. 4 | B + 1 wt % of kaoline | 205 | 88 | 136 | 276 | 221 | 9 |
| Ex. 5 | B + 1 wt % of D (PBS) | 250 | 88 | 135 | 276 | 223 | 9 |
| Ex. 6 | C-1 (block copolymer PPS/MPS[2] | 215 | 73 | 131 | 273 | 209 | 10 |
| Ex. 7 | C-2 (block copolymer PPS/MPS treated with $NH_4Cl$) | 180 | 73 | 114 | 275 | 238 | 6 |
| Ex. 8 | B + 1 wt % of D (PBS) | 200 | 88 | 134 | 276 | 228 | 6 |

[1] Half-width of the peak of the crystallization curve obtained on crystallization by raising temperature. It is an index of the crystallization rate used in Japanese Patent Application Laid-Open (KOKAI) Nos. 57-61,046 (1982) and 57-90,039 (1982). The smaller the half-width is, the larger the crystallization rate becomes. The crystallinity index of every one of the sheets 1 to 8 was below 15%.

[2] PPS and MPS mean paraphenylene sulfide and methaphenylene sulfide, respectively.

(2) Thermoforming (a) FORMING EXAMPLES 1 TO 7

Every sheet was preliminarily heated to 100° C. and was formed by vacuum forming while keeping the sheet in close contact to the inner surface of the mold of normal temperature.

The mold was a tapered, lectangular-type tray with an opening end and had the following dimensions:

Depth: 3 cm
Opening end: 19 cm in length and 11.5 cm in width

Bottom part: 16 cm in length and 9 cm in width.

The formed product was taken out from the mold, was set in the other mold for thermal treatment, was hold for 30 seconds at 180° C. to crystallize and was taken out from the mold.

The formed products of PPPSs did not change their shape in an oven of 230° C.

The crystallinity index of the bottom part of formed container is shown in the following table.

TABLE

| No. | Sheet | Crystallinity Index (%) |
| --- | --- | --- |
| 1 | A-1 | 23 |
| 2 | A-2 | 25 |
| 3 | B | 21 |
| 4 | B + kaoline | 22 |
| 5 | B + D | 22 |
| 6 | C-1 | 24 |
| 7 | C-2 | 26 |

(b) FORMING EXAMPLES 8 TO 10

The sheets A-1, A-2 and B, which were obtained in Molding Examples 1 to 3, were thermoformed as follow.

The mold was a tapered, circular cup with an opening end in the dimensions of 2 cm in depth, 4.5 cm in diameter of an opening end and 3.5 cm in diameter of a bottom part.

After preliminarily heating each sheet to 110° C., the sheet was formed by keeping it in close contact to an inner surface of the mold of normal temperature.

The formed product was taken out of the mold, was set to the other mold for thermal treatment and was kept for 20 seconds at 200° C. to crystallize.

The crystallinity indexes of bottom surface of the formed products were 27% for A-1, 30% for A-2 and 26% for B.

These formed products did not change their shapes in an oven of 230° C.

(c) FORMING EXAMPLES 11 AND 12

The sheets C-1 and C-2 obtained in Molding Examples 6 and 7 were thermoformed using the same mold as in Molding Examples 8 to 10.

After preliminarily heating each sheet to 95° C., the sheet was formed by vacuum forming keeping it in close contact to an inner surface of the mold of normal temperature. The formed product was taken out of the mold, was set to the other mold for thermal treatment and was kept for 30 seconds at 190° C. to be crystallized.

The crystallinity indexes of bottom surface of the formed product were 25% for C-1 and 28% for C-2.

The formed products did not change their shapes in an oven of 230° C.

What is claimed is:

1. A process for producing a crystallized, thin-wall container having a wall thickness of not less than 0.04 mm and less than 1 mm and having a crystallinity index of not less than 15%, which consists essentially of:
   thermoforming, which consists essentially of at least a shaping step and a crystallization step, a sheet having a crystallinity index of less than 15% and an elongation of not less than 100% at room temperature and which is prepared from poly(arylene sulfide) resin having substantially linear structure, containing not less than 70% by weight of a repeating unit of paraphenylene sulfide, having a logarithmic viscosity number of 0.25 to 0.9 measured in a solution of 1-chloronaphthalene at a concentration 0.4 g/dl and at a temperature of 208° C., having at least one of the following procedures selected from the group consisting of (i) being treated with an aqueous solution of a salt of a strong acid and a weak base and (ii) being mixed with not more than 10% by weight of poly(biphenylene sulfide) after polymerization, but before sheet-making in all two procedures; and
   in the crystallization step, the half-width of the peak on a crystallization curve obtained on a sheet crystallized by heating being not more than 15° C.

2. The process according to claim 1, wherein said poly(arylene sulfide) is a block copolymer comprising 70 to 95 mol % of a repeating unit of

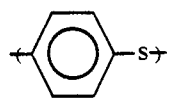

and 5 to 30 mol % of a repeating unit of

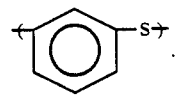

3. A process for producing a crystallized, thin-wall container having a wall thickness of not less than 0.04 mm and less than 1 mm and having a crystallinity index of not lower than 15%, which consists essentially of:
   thermoforming, which consists essentially of at least a shaping step and a crystallization step, a sheet having a crystallinity index of lower than 15% and an elongation of not less than 100% at room temperature and which is prepared from poly(arylene sulfide) resin having a substantially linear structure, containing not less than 70% by weight of a repeating unit of

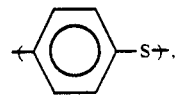

having a logarithmic viscosity number of 0.25 to 0.9 measured in a solution of 1-chloronaphthalene at a concentration of 0.4 g/dl and at a temperature of 208° C., the crystallization rate of the shaped sheet in the crystallization step being increased as a result of initially treating the poly(arylene sulfide) with an aqueous solution of a salt of a strong acid and a weak base after polymerization but before the poly(arylene sulfide) is formed into a sheet; said crystallization step resulting in a sheet crystallized by heating which has a half-width of the peak in its crystallization curve of not more than 15° C.

4. A process for producing a crystallized, thin-wall container having a wall thickness of not less than 0.04 mm and less than 1 mm and having a crystallinity index of not lower than 15%, which consists essentially of:
   thermoforming, which consists essentially of at least a shaping step and a crystallization step, a sheet having a crystallinity index of lower than 15% and an elongation of not less than 100% at room temperature and which is prepared from poly(arylene sulfide) resin having a substantially linear structure, containing not less than 70% by weight of a repeating unit of

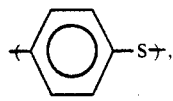

having a logarithmic viscosity number of 0.25 to 0.9 measured in a solution of 1-chloronaphthalene at a concentration of 0.4 g/dl and at a temperature of 208° C., the crystallization rate of the shaped sheet in the crystallization step being increased as a result of mixing the poly(arylene sulfide) with not more than 10% by weight of poly(biphenylene sulfide) after polymerization but before the poly(arylene sulfide) is formed into a sheet; said crystallization step resulting in a sheet crystallized by heating which has a half-width of the peak on its crystallization curve of not more than 15° C.

* * * * *

UNITED STATES PATENT AND TRADEMARK OFFICE
CERTIFICATE OF CORRECTION

PATENT NO. : 5,187,257
DATED : February 16, 1993
INVENTOR(S) : Takayuki Katto et al.

It is certified that error appears in the above-identified patent and that said Letters Patent is hereby corrected as shown below:

On the title page, Item [63],

The Related U.S. Application Data is incorrect, should read as follows:

--Continuation of Ser. No. 524,330, May 16, 1990, abandoned, which is a division of Ser. No. 433,391, Nov. 7, 1989, abandoned, which is a continuation of Ser. No. 185,681, Apr. 22, 1988, abandoned--

Signed and Sealed this

Sixteenth Day of November, 1993

*Attest:*

BRUCE LEHMAN

*Attesting Officer*  *Commissioner of Patents and Trademarks*